(12) United States Patent
Brandt et al.

(10) Patent No.: US 8,866,496 B2
(45) Date of Patent: Oct. 21, 2014

(54) DEVICE FOR THE MEASUREMENT OF COATING THICKNESSES BY MEANS OF MICROWAVES

(75) Inventors: Carsten Brandt, Bremen (DE); Wolfgang Bisle, Bremen (DE); Joerg Dannemann, Hamburg (DE); Johann Hinken, Magdeburg (DE); Thomas Beller, Magdeburg (DE)

(73) Assignee: Airbus Operations GmbH, Hamburg (DE)

( * ) Notice: Subject to any disclaimer, the term of this patent is extended or adjusted under 35 U.S.C. 154(b) by 734 days.

(21) Appl. No.: 12/762,631

(22) Filed: Apr. 19, 2010

(65) Prior Publication Data

US 2011/0062965 A1    Mar. 17, 2011

(30) Foreign Application Priority Data

Sep. 14, 2009  (DE) .......................... 20 2009 012 483

(51) Int. Cl.
    *G01R 27/32*    (2006.01)
    *G01B 15/02*    (2006.01)

(52) U.S. Cl.
    CPC ...................................... *G01B 15/02* (2013.01)
    USPC ......................................................... 324/644

(58) Field of Classification Search
    None
    See application file for complete search history.

(56) References Cited

U.S. PATENT DOCUMENTS

| | | | |
|---|---|---|---|
| 3,102,232 A | | 8/1963 | Leonard et al. |
| 3,581,311 A | | 5/1971 | Kach |
| 4,331,029 A | * | 5/1982 | Wilson ........................ 73/114.29 |
| 5,304,962 A | * | 4/1994 | Bobadilla et al. ............. 333/134 |
| 5,369,367 A | * | 11/1994 | Eisenhart ...................... 324/632 |
| 5,821,410 A | * | 10/1998 | Xiang et al. ..................... 73/105 |
| 5,900,618 A | * | 5/1999 | Anlage et al. .............. 250/201.3 |
| 6,809,533 B1 | * | 10/2004 | Anlage et al. ............. 324/750.02 |
| 7,173,435 B1 | * | 2/2007 | Fay et al. ....................... 324/636 |
| 7,501,833 B2 | * | 3/2009 | Kleismit et al. ............... 324/637 |
| 7,510,436 B2 | * | 3/2009 | Peng ............................. 439/581 |
| 7,898,265 B2 | * | 3/2011 | Takeuchi et al. .............. 324/636 |
| 2009/0140751 A1 | | 6/2009 | Takeuchi et al. |

FOREIGN PATENT DOCUMENTS

| | | |
|---|---|---|
| DE | 1792402 U | 7/1959 |
| DE | 16 16 300 A | 4/1971 |

OTHER PUBLICATIONS

Wu, M., et al.; An improved coaxial probe technique for measuring microwave permittivity of thin dielectric materials. In: Measurement Science and Technology 11, 2000, S. 1617-1622. Printed in the UK.

* cited by examiner

*Primary Examiner* — Paresh Patel
(74) *Attorney, Agent, or Firm* — Leydig, Voit & Mayer, Ltd.

(57) ABSTRACT

A device for measurement of a thickness of a coating applied to a substrate includes a transmitter/receiver module configured to transmit and receive microwave radiation; a computing unit; and a probe having a flange and an inner and an outer conductor, wherein the outer conductor coaxially surrounds the inner conductor, and wherein the inner conductor includes at least one thickened section.

7 Claims, 4 Drawing Sheets

DEVICE FOR THE MEASUREMENT OF COATING THICKNESSES BY MEANS OF MICROWAVES

Priority is claimed to German Utility Patent Application No. DE 20 2009 012 483.5, filed Sep. 14, 2009, the entire disclosure of which is incorporated by reference herein.

The invention relates to a device for the measurement of coating thicknesses by means of microwave radiation, in particular for the thickness measurement of at least one polymer coating, which is applied to a substrate, in particular one formed with an electrically conducting composite material, with a transmitter/receiver module, a computing unit, and with a probe with a flange. In addition the invention relates to a further form of embodiment of the device.

BACKGROUND

In modern aircraft construction it is usual, for visually aesthetic reasons amongst others, as well as for the prevention of corrosion effects, to coat the primary structure of aircraft with at least one polymer layer, for example in the form of paintwork. The polymer layer or layers can fulfil a large number of different functions. For example, a polymer layer can be a decorative coat, a top coat, an adhesion promoter, a filler coat, an anti-static coat, or an anti-erosion coat.

In the case of large passenger aircraft, whose primary structure can feature a surface area of several 1,000 m$^2$, the mass of an applied polymer coating can be of the order of up to several 100 kg. So as not to increase the weight of the primary structure unnecessarily, the material thickness of an applied coating must on the one hand be as even as possible over the whole surface area of the primary structure. Apart from the requirement of an application with an even coating thickness, the material thickness of the coating must not be too high, so as not to impair the hardening process and to avoid the formation of wrinkles, bubbles and/or droplets, and the occurrence of other coating defects. On the other hand the coating thickness of the paintwork must also not turn out to be too small, if the desired functional effects are to be achieved. In general therefore for a complete coating of the primary structure of an aircraft, which as a rule is formed from a multiplicity of polymer layers or coatings, each fulfilling different functions, a material thickness of between 0.05 mm and 0.5 mm is selected. In order to be able to monitor this requirement with its close tolerances, the introduction of coating thickness measurement equipment is essential.

Known from the prior art are firstly purely mechanically acting coating thickness measurement units, with which the determination of the material thickness of the applied polymer coating takes place, for example, by means of the measurement of the penetration path of a measurement body. Such coating thickness measurement units do not allow on the one hand a non-destructive measurement and on the other hand the measurement accuracy that can be achieved is inherently limited in principle, in particular in the case of low material thicknesses of the polymer coating.

Furthermore coating thickness measurement units are of known art, in which the measurement of the material thickness of a polymer coating takes place with eddy current measurements with the introduction of electric coils. While measurement units of this type do allow a non-destructive measurement with a sufficiently high accuracy after calibration has taken place, they have the disadvantage that the substrate with the polymer coating must feature a really high electrical conductivity. Accordingly these units are only suitable to a limited extent for the measurement of the material thickness of a polymer coating on a substrate formed from a composite material, which as a rule has a relatively poor electrical conductivity, as, for example, in the case of a carbon fibre-reinforced epoxy resin.

From the German utility patent DE 1 792 402 a device for the non-destructive measurement of a coating thickness of a medium on a base material is of known art, in which the measurement is based on the evaluation of the phase displacement that ensues with the passage of microwaves through the medium and their subsequent reflection from the base material. However this coating thickness measurement unit of prior art only allows a measurement of the thickness of a coating located on a purely metallic base material. Moreover the dielectric constant $\in$ of the coating to be measured enters into the result of the measurement with the factor $\sqrt{\in}$.

SUMMARY OF THE INVENTION

An aspect of the present invention is therefore to create a device for the reliable measurement of a coating thickness on a substrate with a locally variable electrical conductivity, which at one and the same time ensures a high measurement accuracy, a compact form of construction and to a large extent an independence from the material composition of the substrate, its anisotropy and/or the polymer coating.

In that an internal conductor, coaxially surrounded by an external conductor of the probe, has at least one thickened section, the material thickness of a polymer layer, such as for example a paint layer, can be measured on a substrate in a range between 50 μm and 800 μm with an accuracy previously unachieved. The substrate preferably takes the form of a carbon fibre-reinforced epoxy resin with a weak electrical conductivity, which in addition can be provided with a copper lamination. The term "weak conductivity" defines a conductivity that lies between the electrical conductivity of an insulator and that of a metallic material. The copper lamination, for lightning protection and/or as an earth line, has as a rule a material thickness of up to 0.1 mm, and can for example be produced by the stretch forming of a copper foil slitted lengthwise (so-called "expanded copper foil"). The device, preferably configured as a light and mobile manual unit, enables a non-contacting, mobile and moreover accurate determination of a coating thickness of at least one polymer coating, wherein the probe used for the measurement has a compact construction and allows measurements even in confined installation spaces. Moreover the measurement, in particular when compared with competing capacitive measurement methods, is to a large extent independent of the material composition of the substrate and the polymer coating. The probe is connected to a combined transmitter/receiver module and outputs a complex measurement signal with a real part Q and an imaginary part i, from which a phase displacement $\Delta\phi$ between the outwardly radiated microwave radiation and the microwave radiation reflected from the substrate is calculated in a downstream computing unit by means of extensive algorithms in real time. From the phase displacement $\Delta\phi$ it is finally possible to derive the coating thickness of a polymer coating applied to the substrate in a computing unit by means of further algorithms, and to visualise this directly in millimetres or microns on a display unit downstream of the computing unit. As a rule the device must be calibrated with at least three reference substrates, for which a material thickness of the applied polymer coating as well as the material composition of the polymer coating and the substrate are accurately known. The microwave radiation emitted from the combined transmitter/receiver module preferably lies at a frequency of 24 GHz with a transmission power of up to 10 milliwatts, preferably at one milliwatt. The thickened section provided on the inner conductor in its interaction with the internal wall of the outer conductor represents a parallel capacitance, which leads to resonance effects. As a result of this special probe geometry and the resonance effects that are thereby brought about, on the one hand the influence of the material on the result of the layer thickness measurement is reduced, and on the other hand the phase resolution and thus the measurement accuracy of the device is overall increased.

In a further configuration of the invention provision is made that the inner conductor of the probe has a cylindrical geometry, and the outer conductor of the probe has a hollow cylindrical geometry. As used herein, cylindrical and hollow cylindrical mean essentially cylindrical and essentially hollow cylindrical.

As a result of the cylindrical construction of the inner conductor and the outer conductor—apart from the thickened section of the inner conductor—a simple production of the probe is possible with at the same time a high dimensional accuracy, so that the probe geometry that must be maintained as accurately as possible in the microwave range for defined electrical properties, is achieved with a high accuracy. Moreover the high level of symmetry of the probe enables a reliable measurement of the coating thickness of a polymer coating on a substrate, such as for example a carbon fibre-reinforced epoxy resin, that by virtue of locally differing reinforcement fibre runs and/or densities has a spatially varying electrical conductivity.

The probe is preferably connected by means of a flexible coaxial cable with the transmitter/receiver module, so that a coating thickness measurement can also take place in narrowly confined installation spaces. Alternatively the probe can also be embodied as an integral component of the device, as a result of which a connecting cable is superfluous.

In accordance with a further development of the device provision is made that a dielectric formed with a plastic material, in particular with polytetrafluorethylene, polyetheretherketone, or similar, is arranged between the inner conductor and the outer conductor of the probe, at least in some regions.

By the introduction of a plastic material as a dielectric filling the hollow space between the inner conductor and the outer conductor the mechanical stability of the probe when in operation is increased and the same time its manufacture is simplified or enabled. In addition the penetration of moisture and/or particles of dirt into the intermediate spaces between the inner conductor and the outer conductor of the probe is prevented. Suitable materials for the dielectric are for example polytetrafluoroethylene (PTFE) with a dielectric constant of the order of $\epsilon_r \approx 2$, or polyetheretherketone (PEEK) with a dielectric constant of the order of $\epsilon_r \approx 3$. However, the increased dielectric constants of the plastic materials named in comparison to pure air ($\epsilon_r \approx 1$) must be taken into account when defining the probe geometry.

The outer and inner conductors of the probe are formed with a metallic material, in particular with a brass alloy MS60. As a result a simple, rapid and dimensionally accurate manufacture of the probe is possible by means of the usual production machining techniques. Alternatively metals or metal alloys such as, for example, aluminium or stainless steel can be used.

According to a further embodiment of the invention the computing unit is connected to a display unit, allowing an immediate read-out of a measured coating thickness.

By this means manipulation of the device is significantly simplified for a user. The device preferably allows a direct digital readout of a measured coating thickness, for example in millimetres and/or in microns.

Moreover the objective according to the invention is achieved by means of a further variant of embodiment of the device with an alternative probe geometry in accordance with the attribute of Claim 5, according to which an inner conductor, coaxially surrounded in some regions by an outer conductor of the probe, is arranged at a separation distance from an electrode pin, similarly coaxially positioned in the outer conductor.

By this means the accuracy of the coating thickness measurement can be further increased, in particular in comparison to the first variant of embodiment of the device. As a result of the separation distance between the inner conductor and the electrode pin of the outer conductor a series capacitance is created in the region of the inner conductor, which likewise leads to defined resonance effects. As a result of the effect of this series capacitance, corresponding to the action of the parallel capacitance already elucidated in connection with the first form of embodiment of the device, both the influence of the material on the result of the coating thickness measurement is minimised, and also the phase resolution capability of the device is increased, so that material thicknesses of a polymer coating on a CFRP substrate in a range between about 80 μm and 800 μm can be determined with a high level of measurement accuracy.

In accordance with a further development of this second form of embodiment of the device, provision is made that the inner conductor has a cylindrical geometry and the outer conductor has a hollow cylindrical geometry, wherein an inner conductor diameter preferably corresponds to an electrode pin diameter.

As a result of this geometric configuration an optimal electrical action of the series capacitance in the high frequency circuit ensues, and the manufacture of the probe is simplified.

In accordance with a further development of the device provision is made that the electrode pin is connected in an electrically conducting manner with the outer conductor by means of at least one web.

As a result of the passage of current through the at least one web that by this means ensues, the latter forms an inductance, which in interaction with the series capacitance formed by the separation distance further minimises the influence of the material on the coating thickness measurement. Four webs are preferably provided between the electrode pin centrally arranged in the outer conductor and the outer conductor; in each case these are arranged displaced by 90° from each other. The webs are arranged in the form of spokes, directed radially outwards from the electrode pin and extend in each case from the base of the electrode across a circular opening of the probe flange. The webs can, for example, feature a quadratic cross-sectional geometry with an edge length of 0.5 mm.

DETAILED DESCRIPTION

Figure 1:
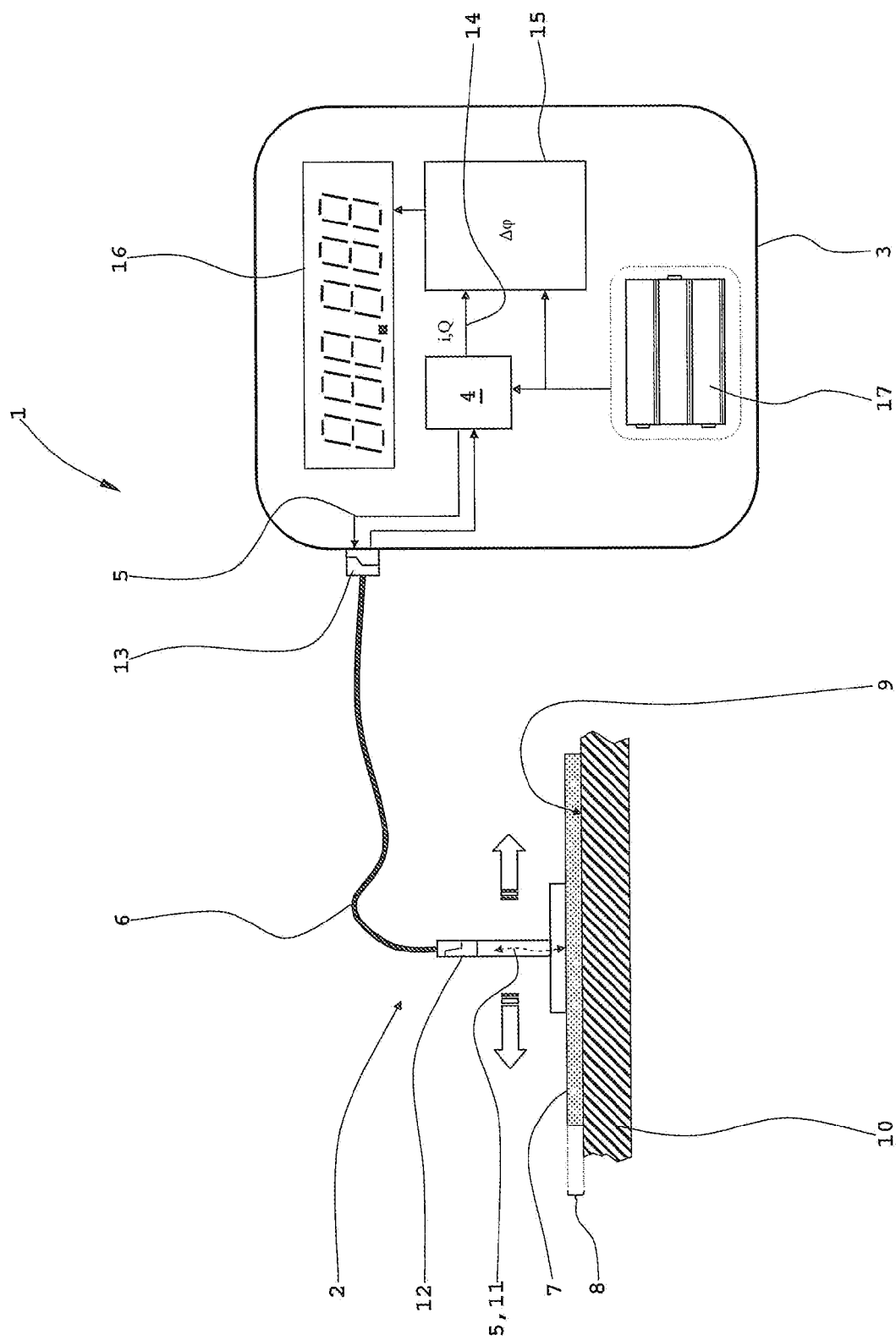
FIG. 1 shows a representation of the structural principles of the device.

In the drawings the same structural elements have in each case the same reference numbers.

FIG. 1 illustrates a schematic representation of the device according to the invention for the measurement of coating thicknesses.

A device 1 comprises amongst other items a mobile probe 2 as well as a housing 3, whose spatial dimensions are selected such that it can preferably be held by a user in one hand. In the housing 3 is located, amongst other items, a combined transmitter/receiver module 4 for microwave radiation. The microwave radiation 5 emitted from the transmitter/receiver module 4 is fed via a coaxial cable 6 to the probe 2. There the emitted microwave radiation 5 penetrates a polymer coating 7, whose material thickness or coating thickness 8 is to be determined, is reflected back in the region of a surface 9 of a substrate, and finally returns as reflected microwave radiation 11 to the combined transmitter/receiver module 4. The highly flexible coaxial cable 6 is connected via two standard connectors 12, 13, which can be released if necessary, with the probe and the housing 3 and enables extensive free movement of the probe 2 on the polymer coating 7. Standard SMA 3.5 mm (female/male) HF connectors can, for example, be used as the connectors with a latching mechanism for security. A so-called "FMCW module" ("Frequency Modulated Continuous Wave") from the Innosent company can, for example, be used as the combined transmitter/receiver module 4.

The transmitter/receiver module 4 emits microwave radiation 5 at a constant frequency of approx. 24 GHz with a transmission power of up to 5 milliwatts, which is radiated via the coaxial cable 6 and the probe 2 onto the substrate 10 and/or the polymer coating 7. In addition the transmitter/receiver module 4 receives the microwave radiation 11 reflected back from the substrate 10 and/or the polymer coating 7. Furthermore the transmitter/receiver module 4 generates a complex measurement signal 14 (i, Q), which is correlated with the coating thickness 7 of the polymer coating 8 that is being measured. Here a part i corresponds to the imaginary part and the signal component Q corresponds to the real part of the complex measurement signal 14. From the complex measurement signal 14 the phase displacement $\Delta\phi$ between the emitted microwave radiation 5 and the reflected microwave radiation 11 is calculated in a computing unit 15 by means of mathematical algorithms. For this purpose a powerful microprocessor, a RAM memory, a ROM memory, electronic measurement amplifier, and analogue/digital converter are located in the computing unit 15, as are further components that are not represented. From the phase displacement $\Delta\phi$ it is possible, using further mathematical steps, to determine accurately the coating thickness 8 of the polymer coating 7 applied onto the substrate 10. A visual display unit 16 is located downstream of the computing unit 15. Numerical (7-segment displays) or alpha numeric LED and/or LCD displays (dot matrix displays) can, for example, be considered for the visual display unit 16. The measured value of the coating thickness 8 can preferably be directly read out by the user from the display unit 16 in millimetres or microns in digital format.

In addition a power supply 17 is integrated into the housing 3, which allows mobile on-site use of the device 1 for a long period of time. The power supply 17 is made up from primary cells or secondary cells, which enable cost-effective operation.

The polymer coating 7 can take the form of any of a number of plastic materials on a one-component or a two-component basis, such as, for example, a top coat, an adhesion coat, a primer coat, a filler coat, an antistatic coat, an anti-erosion coat, a decorative coat, or any combination of at least two of the types of coat named. Alternatively the polymer coating 7 can also fulfil functions that deviate from the above, and can be provided with fibre reinforcement and/or any of a number of filler materials, such as microspheres, for example. Predominantly, however the device 1 is envisaged for the coating thickness measurement of polyurethane top coats on CFRP substrates.

The substrate 10 normally takes the form of a laminar, fibre-reinforced composite material, such as, for example, a carbon fibre-reinforced epoxy resin, which can be provided with an electrically conducting coating, at least in some regions. Alternatively the substrate and/or the composite material can also be manufactured with metallic materials and with a fibre composite material, such as Glare®, for example. Glare® consists of a sequence of aluminium alloy films, which are bonded together over the whole surface with glass fibre-reinforced epoxy resins. Moreover the device 1 also allows the measurement of the coating thickness of polymer coatings on pure metallic substrates, such as, for example, sheets of aluminium alloy or titanium alloy.

Figure 2:
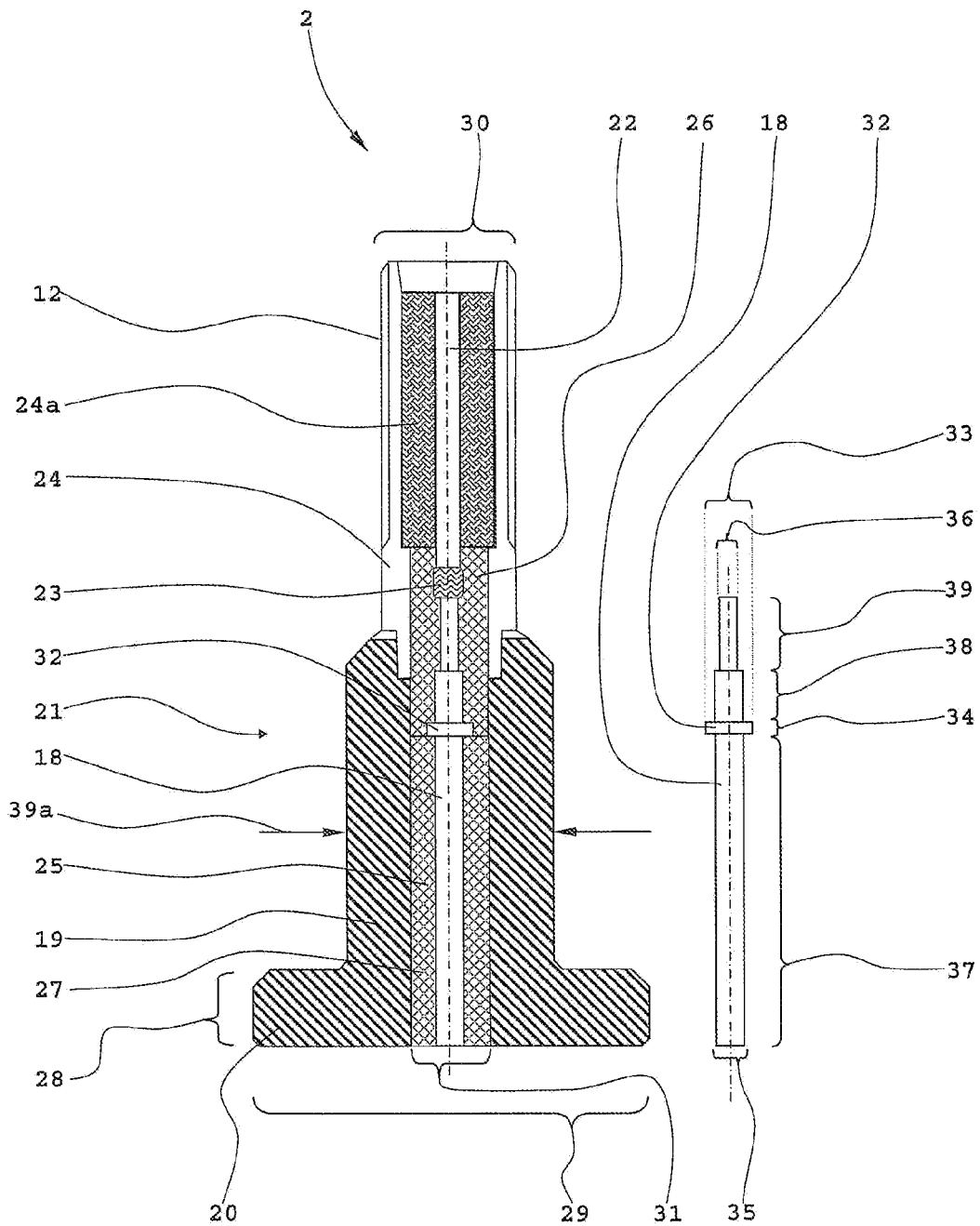
FIG. 2 shows a detailed view of the probe according to FIG. 1.

FIG. 2 illustrates a detailed internal view of the probe from FIG. 1.

The overall resonant design of probe 2 comprises amongst other items an inner conductor 18 with a cylindrical geometry and an outer conductor 19 surrounding the former coaxially, with an approximately hollow cylindrical geometry. For a better diagrammatic overview the inner conductor 18 is represented once again on its own, adjacent to the probe 2. The outer conductor 19 comprises a disk-shaped flange 20 as well as a base body 21 connecting to the former, which also serves for the guidance and/or retention of the probe 2. In a further, alternative form of embodiment of the device 1 this can comprise a plurality of probes, in particular arranged in the form of a matrix, which by means of an automatic manipulation device are guided over the substrate 10. By this means polymer coatings 7 on large surface area substrates 10, possibly curved in one or two dimensions, can be measured fully automatically in a short period of time. The computing unit 15 can furthermore contain algorithms, which allow a direct determination of the mass, i.e. weight, of the polymer coating 7 over a defined surface area of the substrate. The weight values can be visualised on the display unit 16. The area over which the determination of weight takes place, can, for example, be automatically determined on the basis of the paths travelled by the manipulation device, or by means of manual measurements and subsequent calculations of the area of the substrate 10 traversed by the device 1, i.e. by the probe 2.

The connector 12 (the so-called "female") is integrated in an upper region of the base body 21; this allows the coaxial cable 6 to be plugged in and the creation of an electrical connection that can be released again if necessary. By this means the device 1 can be used with a large number of different probes 2, which are matched in particular to the object being measured in question and/or regions with different coating thickness. The probes can, for example, be designed for the coating thickness ranges of 0-300 μm and 300-600 μm. The electrical connection between an inner conductor 22 of the connector 12 and the inner conductor 18 of the probe 2 is made by means of a soldered joint 23. An outer conductor 24 of the connector 12 is screwed in to create an electrically conducting connection with the base body 21, i.e. with the outer conductor 19 of the probe 2. A dielectric 24a of polytetrafluorethylene (PTFE) with a hollow cylindrical geometry is preferably pushed in between the outer conductor 24 and the inner conductor 22 of the connector.

A dielectric 25 with an approximately hollow cylindrical geometry is arranged between the inner conductor 18 and the outer conductor 19 of the probe 2. The dielectric 25 is divided into two parts, with an upper section 26 and a lower section 27, so as to make possible the assembly of the probe 2. Both sections 26, 27 of the dielectric 25 are preferably manufactured from polyetheretherketone (PEEK) with a dielectric constant $\in_r$ of the order of approximately three. Alternatively polytetrafluorethylene (PTFE) can be used with a dielectric constant $\in_r$ of the order of approximately two. The two sections 26, 27 of the dielectric 25 can alternatively be manufactured in one piece. A dielectric 25 of PEEK can withstand a higher mechanical loading compared with a dielectric 25 of PTFE.

In the example of embodiment shown in FIG. 2 a flange thickness 28 of the probe 2 is 3.5 mm, a flange diameter 29 is 15.0 mm and a connector diameter 30 is 6.0 mm.

An internal diameter 31 of the outer conductor 19 is 3.0 mm. The inner conductor 18 features a thickened section 32, which in conjunction with the outer conductor 19 represents a parallel capacitance, which leads to the desired resonance effects. These increase the phase resolution capability and the measurement accuracy of the device 1. The thickened section 32 likewise features a cylindrical configuration and is arranged symmetrically with reference to the inner conductor 18. A thickened section diameter 33 is 2.0 mm and a thickened section height 34 is 0.4 mm. An inner conductor diameter 35 is 1.2 mm and an upper inner conductor diameter 36 is 0.93 mm. A length 37 of the inner conductor 18 below the thickened section 32 is 11.4 mm, while a length 38 of the inner conductor 18 above the thickened section 32 is of the order of 2.2 mm, and an upper end section 39 of the inner conductor 18 is 5.0 mm long. In the region of the lengths 37, 38 the inner conductor diameter 35 is preferably selected to be equally large with 1.2 mm. An overall length of the inner conductor 18, not designated in FIG. 2, (=length 37+thickened section height 34+length 38+upper end section 39) comes to 19.0 mm. A numerical ratio between the internal diameter 31 of the outer conductor 24 for the particular example of embodiment of FIG. 2 is approximately 2.5. A numerical ratio between the length 37 and the length 38, in each case less the half of the thickened section height 34, which here is 0.4 mm, is approximately 5.0.

The flange diameter 29 of the probe 2 is in general selected to be twice as large as an outer conductor diameter 39a of the probe 2. In principle the outer conductor diameter 39a determines a penetration depth into the object to be measured of a microwave field, not shown in any further detail, emitted from the probe, while a size of a measurement spot, likewise not indicated, is defined by the inner conductor diameter 35 of the probe 2, in which spot the determination of the coating thickness 8 of the polymer coating 7 on the substrate 10 takes place. In the axisymmetric example of embodiment of the probe 2 shown the measurement spot has an approximately circular geometrical configuration. The above design criteria for the probe 2 also apply correspondingly for a second variant of embodiment in accordance with FIGS. 3, 4.

Both the inner conductor 18 and also the outer conductor 19 are formed with a material that is a good electrical conductor, for example the brass alloy MS60, which moreover is easy to machine. An underside, not designated, of the flange 20 can be provided with a low friction coating, for example PTFE, so as to avoid any mechanical damage of polymer coating 7.

The dimensions cited purely represent an example of embodiment of the probe 2 and have no limiting effect. As a function of the object to be measured in question, that is to say, the combination of the substrate and the polymer coating located on the former, probe geometries and/or dimensions deviating significantly from the representation of FIG. 2 can be necessary, so as to achieve optimal measured properties with the device.

Figure 3:
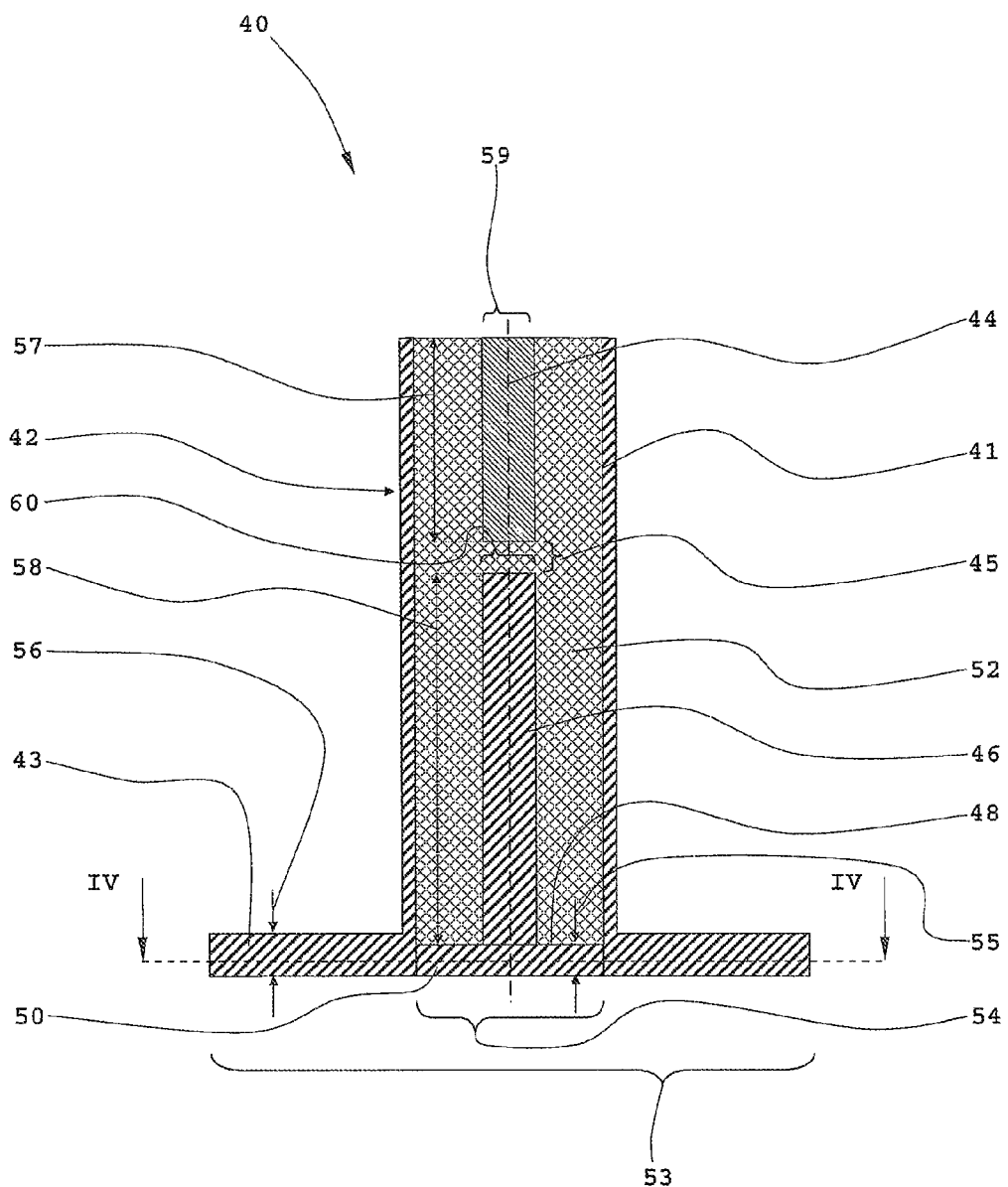
FIG. 3 shows a schematic cross-sectional representation through a further variant of embodiment of the probe.
Figure 4:
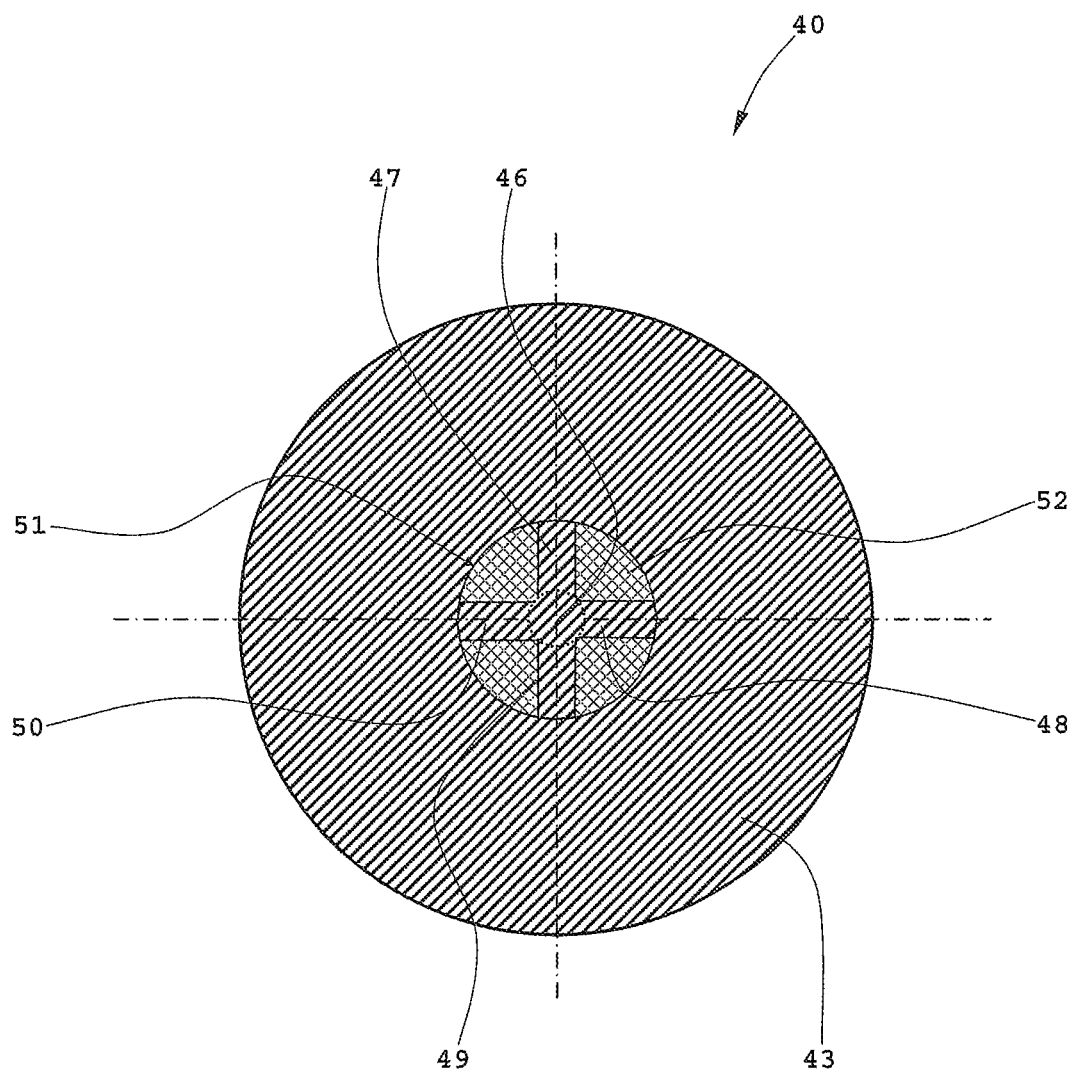
FIG. 4 shows a cross-section through the probe along the line IV-IV in FIG. 3.

FIGS. 3, 4 to which reference is made in the further progression of the description, illustrate an alternative form of embodiment of the probe according to FIG. 1.

A probe 40 comprises, amongst other items, a hollow cylindrical outer conductor 41 with a base body 42 and a disk-shaped flange 43 adjoining the former lower down. The outer conductor 41 surrounds an inner conductor 44 coaxially. The inner conductor 44 is arranged with a vertical separation distance from an electrode pin 46 within the outer conductor 41. The inner conductor 44 and the electrode pin 46 each have a cylindrical configuration and preferably have the same diameter. Both the inner conductor 44 and also the electrode pin 46 are centrally, that is to say, coaxially, positioned in the outer conductor 41. The mechanical connection of the electrode pin 46 to the outer conductor 41 is made in the example of embodiment shown in FIGS. 3, 4 by a total of four webs 47 to 50, which are provided in the region of the flange 43. The four webs 47 to 50 are each arranged evenly at an angle to one another of 90° around the circumference of an approximately circular flange opening 51 (cf. in particular FIG. 4). The webs 47 to 50 preferably feature a quadratic cross-sectional geometry with an edge length of approximately 0.5 mm. The number and the arrangement of the webs can vary. In principle the presence of one web is sufficient to locate the electrode pin 46 centrally in the outer conductor 41, but a symmetrical arrangement of the webs is to be preferred, so that as a rule an even number of webs is to be provided. The outer conductor 41, the webs 47 to 50 as well as the electrode pin 46 of the probe 40 are preferably manufactured in one piece from a material with good electrical conductivity, such as, for example, the brass alloy MS60. Alternatively the components named can be manufactured separately, as a result of which the assembly in the probe 40 is simplified; however, additional solder points are necessary for the manufacture of electrically conducting connections between the probe components mentioned. In this configuration, however, care must be taken to achieve a good permanent electrically conducting connection between the components, in order to ensure the functionality of the probe 40. A dielectric 52 is located between the inner conductor 44 and the outer conductor 41, and also between the webs 47 to 50; with regard to its electrical and mechanical properties as well as its structural design reference is made to the statements already made in the context of the description of FIG. 2. A flange diameter 53 can, for example, be 19.0 mm, while an internal diameter 54 and/or the flange recess 51 of the outer conductor 41 on the basis of the dimensions of the probe 2 in accordance with FIG. 2 is 3.0 mm.

A web thickness 55 of the webs 47 to 50 is, as can be seen from FIG. 3, slightly smaller than a flange thickness 56, but can alternatively be selected to be the same size. A length 57 of the inner conductor 44, a length 58 of the electrode pin 46, the separation distance 45 including the web thickness 55 can together, once again on the basis of the mechanical dimensioning of the probe 2 according to FIG. 2, come to, for example, 19 mm. An inner conductor diameter 59, which preferably corresponds to an electrode pin diameter, not designated, can, for example, be 1.2 mm. The exact dimensions of the probe 40 must—corresponding to the probe 2 according to FIGS. 1, 2—as a rule be adapted to the particular circumstances of the object to be measured in question. An electrode pin diameter 60 preferably corresponds to an inner conductor diameter 59.

The separation distance 45 between the inner conductor 44 and the electrode pin 46 forms, in contrast to the form of embodiment of the probe 2 in accordance with FIG. 2, a series capacitance, which once again results in resonance effects in the probe 40, as a result of which the phase resolution capability and the material insensitivity of the device 1 are increased. Moreover a high frequency current flows through the four solid webs 47 to 50, so that these act as inductances in the high frequency range, which in interaction with the series capacitance formed by the vertical separation distance 45 further increase the resonance effects in the probe 40.

By this means the probe 40, in comparison to the first form of embodiment of the probe 2 according to FIG. 2, whilst accepting an overall more complex design, features a further increase in measurement accuracy and at the same time a further minimised dependence on the material composition of the polymer coating 7 and/or the substrate 10.

From the complex measurement signal 14 outputted from the transmitter/receiver module 4 the phase displacement Δϕ between the emitted microwave radiation 5 and the reflected microwave radiation 11 is calculated in the computing unit 15 by means of mathematical algorithms. From the phase displacement Δϕ it is possible with the application of further mathematical steps to determine accurately the coating thickness 8 of the polymer coating 7 applied onto the substrate 10, and to visualise the thickness digitally for a user in the form of a direct read-out, for example, in μm or mm.

REFERENCE SYMBOL LIST

1. Device
2. Probe
3. Housing
4. Transmitter/receiver module
5. Emitted microwave radiation
6. Coaxial cable
7. Polymer coating
8. Coating thickness (polymer coating)
9. Surface (substrate)
10. Substrate
11. Reflected microwave radiation
12. Connector
13. Connector
14. Complex measurement signal (i, Q)
15. Computing unit
16. Display unit
17. Power supply
18. Inner conductor
19. Outer conductor
20. Flange (disk-shaped)
21. Base body
22. Inner conductor (connector)
23. Solder joint
24. Outer conductor (connector)
24a. Dielectric (connector)
25. Dielectric (probe)
26. Upper section (dielectric)
27. Lower section (dielectric)
28. Flange thickness
29. Flange diameter
30. Connector diameter
31. Internal diameter (probe outer conductor)
32. Thickened section (inner conductor)
33. Thickened section diameter
34. Thickened section height
35. Inner conductor diameter
36. Upper inner conductor diameter
37. Length (inner conductor)
38. Length (inner conductor)
39. Upper end section (inner conductor)
39a. Outer conductor diameter
40. Probe (second variant of embodiment)
41. Outer conductor
42. Base body
43. Flange (disk-shaped)
44. Inner conductor
45. Vertical separation distance
46. Electrode pin
47. Web
48. Web
49. Web
50. Web
51. Flange opening
52. Dielectric
53. Flange diameter
54. Internal diameter (probe outer conductor)
55. Web thickness
56. Flange thickness
57. Length (inner conductor)
58. Length (electrode pin)
59. Inner conductor diameter
60. Electrode pin diameter

What is claimed is:

1. A device for measurement of a thickness of a coating applied to a substrate comprising:
   a transmitter/receiver module configured to transmit and receive microwave radiation;
   a computing unit; and
   a probe having a flange and an inner and an outer conductor, wherein the outer conductor coaxially surrounds the inner conductor, and wherein the inner conductor includes a first section and a second section having a first thickness and at least one thickened section having a second thickness thicker than the first thickness disposed between the first section and the second section, the at least one thickened section interacting with the outer conductor to form a parallel capacitance.

2. The device as recited in claim 1, wherein the coating includes at least one polymer coating.

3. The device as recited in claim 1, wherein the substrate includes an electrically conducting composite material.

4. The device as recited in claim 1, wherein the inner conductor has a cylindrical geometry and the outer conductor includes a hollow cylindrical geometry.

5. The device as recited in claim 1, further comprising a dielectric including a plastic material disposed between the inner conductor and the outer conductor.

6. The device as recited in claim 5, wherein the plastic material includes one of a polytetrafluorethylene, a polyetheretherketone, and a similar material.

7. The device as recited in claim 1, further comprising a computing unit and a display unit, wherein the computing unit is connected to the display unit so as to allow a direct read-out of a measured layer thickness.

* * * * *